United States Patent
Messing et al.

(10) Patent No.: US 12,066,004 B2
(45) Date of Patent: Aug. 20, 2024

(54) ROTOR BLADE, WIND TURBINE, SERRATION ANGLE, ENVIRONMENTAL PARAMETERS

(71) Applicant: Wobben Properties GmbH, Aurich (DE)

(72) Inventors: Ralf Messing, Aurich (DE); Jochen Stemberg, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/169,616

(22) Filed: Feb. 15, 2023

(65) Prior Publication Data

US 2023/0258151 A1 Aug. 17, 2023

(30) Foreign Application Priority Data

Feb. 15, 2022 (EP) .................................... 22156881

(51) Int. Cl.
*F03D 1/06* (2006.01)

(52) U.S. Cl.
CPC .... *F03D 1/0675* (2013.01); *F05B 2240/2211* (2013.01); *F05B 2240/3042* (2020.08); *F05B 2240/3052* (2020.08); *F05B 2250/411* (2013.01)

(58) Field of Classification Search
CPC .... F03D 1/0675; F03D 1/0633; F03D 1/0641; F03D 1/0645; F05B 2240/122; F05B 2240/3052; F05B 2240/3042; F05B 2240/2211; F05B 2250/411
See application file for complete search history.

(56) References Cited

U.S. PATENT DOCUMENTS

| | | | | |
|---|---|---|---|---|
| 9,719,488 | B2* | 8/2017 | Oerlemans | F03D 1/0608 |
| 9,945,357 | B2* | 4/2018 | Enevoldsen | F03D 7/0204 |
| 10,570,881 | B2* | 2/2020 | Egedal | F03D 7/0228 |
| 10,731,626 | B2* | 8/2020 | Arce | F03D 1/0633 |
| 2011/0142666 | A1* | 6/2011 | Drobietz | F03D 1/0675 |
| | | | | 416/228 |
| 2015/0098821 | A1* | 4/2015 | Mayda | F03D 7/04 |
| | | | | 416/23 |
| 2018/0142671 | A1* | 5/2018 | Asheim | F03D 1/0675 |
| 2020/0370534 | A1 | 11/2020 | Rubner | |
| 2022/0268253 | A1* | 8/2022 | Messing | F03D 1/0641 |
| 2024/0011463 | A1* | 1/2024 | Stemberg | F03D 80/00 |

* cited by examiner

*Primary Examiner* — Sang K Kim
(74) *Attorney, Agent, or Firm* — Seed IP Law Group LLP

(57) ABSTRACT

A rotor blade of a wind turbine, to an associated wind turbine, to an associated wind farm and to associated methods. The rotor blade has a leading edge and a trailing edge and extends in a longitudinal direction of the rotor blade between a root end and a tip end, wherein a direct connection between the leading edge and the trailing edge is referred to as a chord line, wherein the rotor blade has serrations in the region of the trailing edge at least in some section or sections, wherein each of the serrations has a base line, which is arranged at the trailing edge, and an end point, which is furthest away from the base line, which together span a plane of the serration, wherein an angle between the plane of at least one of the serrations and the profile chord of the rotor blade is formed as a function of at least one environmental parameter at the installation location of the wind turbine.

15 Claims, 7 Drawing Sheets

ROTOR BLADE, WIND TURBINE, SERRATION ANGLE, ENVIRONMENTAL PARAMETERS

BACKGROUND

Technical Field

The present disclosure relates to a rotor blade of a wind turbine, an associated wind turbine and a method for optimizing a rotor blade, a method for operating a wind turbine and a method for servicing a rotor blade.

Description of the Related Art

Wind turbines are widely known. By means of aerodynamically acting rotor blades, they serve to extract energy from the wind and to convert it into electric energy, for example.

One goal here is to maximize the energy yield taken from the wind. Rotor blades are developed and manufactured for specific design parameters and are then optimally designed for these given parameters. However, as soon as there are deviations between these design parameters and environmental parameters at the installation location of the wind turbine, the rotor blade is no longer optimally designed for the changed environmental parameters and the induction of the rotor blade is less advantageous, leading, for example, to a reduction in the yield of the rotor blade.

US 2011/0142666 A1 discloses a rotor blade assembly for a wind turbine. The rotor blade assembly includes a rotor blade having surfaces defining a pressure side, a suction side, a leading edge, and a trailing edge extending between a tip and a root. The rotor blade further includes a noise reducer configured on a surface of the rotor blade, the noise reducer comprising a plurality of serrations, each of the plurality of serrations defining a centerline. The centerline of each of the plurality of serrations defines a individual tailored angle dependent on at least one of span-wise location, local chord, width, length, bend angle, and thickness.

U.S. Pat. No. 9,719,488 B2 discloses an arrangement to reduce noise of a wind turbine rotor blade, including a wind turbine rotor blade and a noise reduction device. The noise reduction device includes a serrated extension for at least reducing noise generated from the wind turbine rotor blade, the noise reduction device attached to the trailing edge section. The serrated extension has a number of first and second teeth. The designs of the first and second teeth are differently compared to each other such that suction side noise and pressure side noise are both reduced by the teeth of the serrated extension. Advantageously, the first teeth and the second teeth are arranged in an alternating, periodic pattern and differ from each other by an angle of inclination with regard to a trailing edge streamline and or by its planform shape.

US 2015/0098821 A1 discloses a reverse wind load mitigation device is provided for a wind turbine blade. The device comprises a hinge member attachable to a trailing edge of a wind turbine blade. The separated flow inducer is associated with the hinge member and is configured to pivot about or with the hinge member toward at least one of the surfaces in response to wind traveling from a direction of the trailing edge. The separated flow inducer is effective to induce flow separation over at least one of the surfaces.

BRIEF SUMMARY

Provided are rotor blades to be operated in an optimum manner for a larger bandwidth of environmental parameters.

In a first aspect, a rotor blade of a wind turbine is provided, wherein the rotor blade has a leading edge and a trailing edge and extends in a longitudinal direction of the rotor blade between a root end and a tip end, wherein a direct connection between the leading edge and the trailing edge is referred to as a chord line, wherein the rotor blade has serrations in the region of the trailing edge at least in some section or sections, wherein each of the serrations has a base line, which is arranged at the trailing edge, and an end point, which is furthest away from the base line, which together span a plane of the serration, characterized in that an angle between the plane of at least one of the serrations and the associated local profile chord of the rotor blade is formed as a function of at least one environmental parameter at the installation location of the wind turbine.

Serrations are known from fluid mechanics and are also referred to as "trailing edge ridges." In this context, the serration as such comprises one or more preferably serrated notches in the region of the trailing edge of the rotor blade, with the result that the outflow edge in the region of the serrations is not rectilinear in the longitudinal direction of the rotor blade.

During the flow around the rotor blade surface, what is known as a boundary layer is formed on the said surface, in which turbulences (vortices) of different sizes are formed. In the region of the blade trailing edge, these vortices then produce the typical, broadband noise of a rotor blade (trailing edge sound). The resulting air flow around the rotor blade with its large vortices is broken up into smaller vortices by the teeth or interruptions of a different shape on the outflow edge, as a result of which the blade noise, for example, is reduced.

In the context of the present disclosure, a "serration" refers to just one tooth of such a trailing edge ridge formation.

In addition to the acoustic effect, the serrations also change the local induction factor of the rotor blade at the position of the serration. That is to say that the serrations also have an effect on the yield of the wind turbine.

It is an insight of the inventors of the present disclosure that the effect of the serration on the local induction factor depends on the installation angle of the serration relative to the local profile chord. Thus, the inventors have realized that the angle of the serration can contribute to the selective increase or reduction of local induction factors.

At the same time, the inventors have found that environmental parameters at the installation location of the wind turbine may differ from design parameters of the rotor blade. Deviations of the actual environmental parameters from design parameters regularly lead to losses in yield since, for example, the induction factor distribution is no longer ideal owing to the actual environmental parameters. Adapting the angle allows particularly effective and simple compensation of the effects of the environmental parameters without making structural or geometric adaptations to the rotor blade. This enables a rotor blade to be operated in an optimum manner without difficulty for a large range of environmental parameters.

The serrations can be manufactured integrally with the rotor blade or mounted on the rotor blade, being bonded on adhesively, for example. In each case, the serrations extend beyond the trailing edge in the direction of flow around the blade, wherein the trailing edge is defined in the context of this disclosure as the rearmost connecting line at which no interruptions of the outflow edge are yet present.

The trailing edge denotes the connection between the points at which the profile of the rotor blade is continuous, that is to say between the connection points of the suction-side and the pressure-side profile contour. Moreover, the trailing edge is also continuous in the longitudinal direction of the rotor blade, that is to say that the outflow edge, which is interrupted, for example, by serrations, is interrupted only after the trailing edge in the direction of flow. If the profile of the rotor blade is not continuous, for example if the rotor blade has what is referred to as a "blunt trailing edge," it is the points which are located in the center of the "blunt trailing edge" which are taken into account, wherein the center is to be understood in a direction perpendicular to the profile chord and to the "blunt trailing edge."

The leading edge consists of the points of the profile which are in each case furthest away from the trailing edge perpendicularly to the longitudinal direction of the rotor blade. The profile chord designates in each case the shortest connection between the leading edge and the trailing edge.

Each of the serrations has an associated local profile chord. The associated local profile chord of one of the serrations is preferably the profile chord which is located in the center of the base line of the respective serration in the longitudinal direction of the rotor blade. In the present disclosure, the term profile chord in combination with one of the serrations is to be understood as the associated local profile chord.

Each of the serrations has a base line, which is preferentially arranged at the trailing edge. A base line which is arranged at the trailing edge means that the base line is on the trailing edge or coincides with the trailing edge. If the serrations are not mounted directly on the trailing edge but in the region of the trailing edge, e.g., are not integrated directly into the rotor blade, and are mounted at a distance from the trailing edge, then it should be understood that the base line of the serration is obtained by vertical projection of the trailing edge onto the serration in the depth direction of the profile, perpendicularly to the trailing edge and to the profile chord. In the context of this disclosure, this case too is understood as "a base line which is arranged at the trailing edge."

In the region of the trailing edge preferably means that the serrations are arranged directly at the trailing edge or in the vicinity of the trailing edge. The serrations can be integrated in the rotor blade or mounted on it. The vicinity of the trailing edge preferably comprises a region which, starting from the trailing edge, extends up to a distance of 20% of the local profile chord, preferably up to a distance of 5% of the local profile chord, particularly preferably up to a distance of 1% of the local profile chord. Thus, the region of the trailing edge extends onto the pressure side and onto the suction side of the rotor blade.

The rotor blade has, at least in some section or sections, serrations in the region of the trailing edge. This should preferably be understood to mean that the rotor blade has just one serration, which is arranged at any desired position in the region of the trailing edge of the rotor blade, or just two serrations, which are arranged adjacent to one another or at any desired position in the region of the trailing edge of the rotor blade, or a plurality of serrations, which are arranged in one or more sections in the region of the trailing edge of the rotor blade.

Serrations are a plurality of preferably periodic depressions or notches in a longitudinal direction of the rotor blade. The serrations preferably have a sawtooth configuration, wherein the included angle between two adjacent teeth is preferably 60°, but other shapes of the serrations are possible, in particular curved shapes or brushes.

For serrations that are mounted on the trailing edge, the base line of a respective serration is the intersection between the trailing edge and the respective serration.

It is also possible for serrations not to be mounted directly on the trailing edge but to be mounted in the region of the trailing edge, that is to say, for example, at a certain distance from the trailing edge. In this case, too, the surface of the respective serrations projects beyond the trailing edge in order to ensure the effect on the separations behind the trailing edge. For this serration, the trailing edge is preferably projected perpendicularly, perpendicularly to the trailing edge and to the profile chord, onto the serration, and this projection onto the serration gives the base line of the serration. If the serration is configured in such a way that the perpendicular projection, perpendicularly to the trailing edge and to the profile chord, of the trailing edge intersects the serration several times, then only the intersection which is closest to the trailing edge is to be taken into account.

In some embodiments, a plurality of serrations is provided in the form of a serration unit with a common base plate. For instance, the serrations of the serration unit may be formed by cutting serrations out of a rectangular base plate as known in the art. The serration unit may include a profile element with a continuous profile section, which profile element, for the purpose of changing the profile depth of the rotor blade, is able to be attached at or in the region of the rotor blade trailing edge, and the extension of which profile element beyond the rotor blade trailing edge is determined, in one example, in a manner dependent on a standardized load-dependent dimensioning of the profile depth of the rotor blade and a load level which is established at an erection location of the wind turbine as disclosed in US 2020/0370534 A1, the content of which is incorporated herein in its entirety.

An end point is the point of the serration that is furthest away from the base line of the serration. It is possible that several points on the serration are furthest from the base line of the serration and that all these points are at an equal distance from the base line of the serration, and in such a case there is a plurality of end points.

The plane of the serration is formed between the base line of the serration and the end point of the serration. If the serration exhibits a plurality of end points, then, in order to define the plane of the serration, the end point is selected which exhibits the angle of greatest magnitude between the plane of the serration and the local profile chord of the rotor blade.

In order to determine the angle between the plane of in each case one of the serrations and the profile chord of the rotor blade, the profile chord whose position in the longitudinal direction of the rotor blade corresponds to the center of the base line of in each case one of the serrations is preferably selected. As an alternative, one preferred possibility is to select the profile chord which leads to the greatest angle between the plane of in each case one of the serrations and the profile chord. In order to determine the profile chord which leads to the greatest angle between the plane of in each case one of the serrations and the profile chord, there is the preferred possibility, for each profile chord, of determining the angle between the plane of in each case one of the serrations and this profile chord in order then to determine the profile chord which exhibits the greatest angle.

The installation location of a wind turbine is the location at which the wind turbine is erected or provided for erection.

The angle of at least one of the serrations can be adjusted passively or actively. Active adjustment is preferably when the angle is adjusted in connection with changing environmental parameters at the installation location of the rotor blade. In other words, the angle is adjusted regularly or at least once after the rotor blade has been commissioned in order to optimize the rotor blade for the current environmental parameters at the installation location of the rotor blade.

Instead of the current environmental parameters at the installation location of the rotor blade, it is also possible to use an extreme value, an average value and/or a variance of environmental parameters at the installation location of the rotor blade, which have preferably been measured or estimated over a period of time. In particular, adjustment of the angle according to the four seasons, winter, spring, summer and autumn, is also advantageous.

According to one preferred embodiment of the rotor blade, the at least one environmental parameter at the installation location of the wind turbine includes one or more parameters which are indicative of air density, air humidity, temperature, air pressure, air pollution, turbulence or turbulence intensity, shear, and/or wind speed.

The parameters which are indicative of air density, air humidity, temperature, air pressure, air pollution, turbulence or turbulence intensity, shear, and/or wind speed have an effect on the induction of the rotor blade at the respective installation location of the wind turbine and are therefore particularly suitable as environmental parameters. Taking these parameters into account, the induction of the rotor blade can be optimized, in particular the induction of the rotor blade can be optimized for the at least one environmental parameter of the installation location of the wind turbine.

The air pollution can be taken into account in order to determine or estimate the rate of contamination of the rotor blades and/or the maximum contamination of the rotor blade that may be reached. Air pollution is, in particular, an average insect density or particle density, wherein, in particular, particles having at least a diameter of 1 μm, salt content and/or corrosion-accelerating chemicals are taken into account. A salt content in the air is particularly important when the wind turbine is operated in a coastal region. A coastal region is preferably understood to mean a region which extends from the sea shore to 100 kilometers inland. Corrosion-accelerating chemicals are significant particularly when the wind turbine is operated in an area of up to 200 kilometers around air-polluting industry, such as preferably coal-fired power plants, chemical industry, recycling plants, incineration plants and/or textile industry. Where present, one or more of these factors can increase or affect the degree of air pollution and thus the rate of contamination. Where present, corrosion-accelerating chemicals and/or salt content can affect or accelerate the rate at which the rotor blade corrodes.

According to an advantageous embodiment of the rotor blade, the parameter which is included in the at least one environmental parameter at the installation location of the wind turbine comprises an extreme value, an average value and/or a variance of the air density, air humidity, temperature, air pressure, air pollution, turbulence or turbulence intensity, shear, and/or wind speed.

It is advantageous to take into account an extreme value in order to ensure compliance with regulations, such as preferably sound pressure regulations, and/or in order to ensure the safety of the wind turbine by ensuring that the wind turbine also withstands the mechanical loads to which it is exposed, for example in extreme environmental conditions. In particular, an average value can advantageously be used in order to allow simple evaluation of the respective environmental parameter. The variance can advantageously be taken into account in order to define a fluctuation or quality and thus also a reliability of the environmental parameter used.

In particular, an extreme value can be a maximum or minimum value which has been measured at the installation location, preferably in the last 5 years, 20 years and/or 100 years. In particular, it is advantageous to use as the extreme value a maximum or minimum value which has been derived from a maximum or minimum value measured at the installation location of the wind turbine on the basis of a safety margin. In particular, it is possible to use as the extreme value a maximum or minimum value which lies outside the expected values on the basis of the environment at the installation location of the wind turbine.

According to one preferred embodiment of the rotor blade, the angle between the plane of in each case one of the serrations and the profile chord of the rotor blade is different for at least two of the serrations.

Changing an angle between the plane of a serration and the profile chord of the rotor blade affects the local induction of the rotor blade. Since the angle is different for at least two of the serrations, the local induction of the rotor blade can be optimized with more degrees of freedom than if all serrations had the same angle and the induction of the rotor blade can thus, in particular, be optimized better.

With different angles between the plane of in each case one of the serrations and the profile chord of the rotor blade for at least two of the serrations, position-dependent optimization of the induction of the rotor blade is made possible as a function on the mounting position of at least one of the serrations. It is thus possible, in particular, to optimize for given environmental parameters a rotor blade which has unfavorable induction at at least one position of the rotor blade, for example because of transport restrictions and/or stability reasons and/or because the rotor blade has been designed and/or optimized for other environmental parameters. This optimization is achieved by optimizing the at least one position at which the rotor blade has unfavorable induction by means of adjustment of the angle of at least one of the serrations in accordance with the mounting position.

According to one preferred embodiment of the rotor blade, the angle between the plane of at least one of the serrations and the profile chord of the rotor blade is formed as a function of the at least one environmental parameter and additionally as a function of the mounting position of the relevant serration in the longitudinal direction of the rotor blade.

According to one preferred embodiment of the rotor blade, in the event of a deviation from the design air density at the installation location, the angle between the plane of in each case one of the serrations and the profile chord of the rotor blade has an absolute value greater than 0 degrees for at least one of the serrations.

In the case of an air density that deviates from the design air density of the rotor blade, the induction of the rotor blade is not optimal. It is thus advantageous to adjust the angle between the plane of in each case one of the serrations and the profile chord of the rotor blade, for at least one of the serrations, in such a way that the angle is not equal to zero. The deviation of the angle from zero affects the induction of the rotor blade, and the angle can be selected in such a way that the induction of the rotor blade is improved.

The rotor blade is optimized for given environmental parameters, in particular for the given air density. The rotor blade exhibits the best possible induction for the environmental parameters for which it has been optimized, and these given environmental parameters are referred to as design parameters of the rotor blade. In particular, the air density for which the rotor blade has been optimized is referred to as the design air density. In order to be able to determine an unknown design air density of the rotor blade, the rotor blade can be simulated and optimized with the blade element method, for example with varying air density, and the air density for which the rotor blade exhibits the best induction values, for example, can be designated as the design air density of the rotor blade.

According to a particularly preferred embodiment of the rotor blade, the at least one environmental parameter comprises an extreme value, an average value and/or a variance of the air density, and the angle between the plane of at least one of the serrations and the profile chord of the rotor blade increases in the direction of the pressure side with decreasing air density.

As the air density falls, the lift of the rotor blade falls. With an increasing angle, in the direction of the pressure side of the rotor blade, between the plane of at least one of the serrations and the profile chord of the rotor blade, the lift of the rotor blade increases since the profile curvature as a whole effectively increases. Thus, it is advantageous to increase the angle between the plane of at least one of the serrations and the profile chord of the rotor blade in the direction of the pressure side of the rotor blade with as the air density falls.

According to a particularly advantageous embodiment of the rotor blade, the angle is more than 0 degrees, preferably more than 4 degrees, in the direction of the pressure side at a low air density which is below the design air density by at least a threshold value, in particular at least $0.075$ kg/m$^3$ below the design air density. It is assumed here that, in this embodiment, the angle at design air density is 0 degrees, although, of course, relative displacements simply take place if the angle at the design air density is different from 0 degrees.

An air density which is below the design air density of the rotor blade has the effect, in particular, that the lift of the rotor blade is reduced in comparison with the lift of the same rotor blade at the design air density. Since the angle is more than 0 degrees, in the direction of the pressure side, the lift of the rotor blade is increased. Thus, in the case of an air density which is below the design air density of the rotor blade, it is advantageous to adjust the angle to more than 0 degrees, in the direction of the pressure side. The angle is preferably adjusted to more than 4 degrees.

According to one preferred embodiment of the rotor blade, an average of the angles between the respective planes of the serrations and the profile chord of the rotor blade at an air density, at the installation location of the rotor blade, which is equal to or less than the design air density, is greater in the direction of the pressure side than the average angle between the respective planes of the serrations and the profile chord of the same rotor blade which has, however, been optimized for an air density above the design air density.

By taking into account the average angles, the overall effect of the serrations can be optimized. Even if, for example, the angles of some of the serrations—e.g., for load reasons—deviate from the design case in a different direction, that is to say, for example, in the direction of the suction side, the increase in yield can be achieved by an average angle setting in the direction of the pressure side.

In order to obtain the average of the angles between the respective planes of the serrations and the profile chord of the rotor blade, in one embodiment each angle between the respective planes of the serrations and the profile chord of the rotor blade is weighted on the basis of the size of the plane of the respective serration and/or the shortest distance between the plane of the respective serration and its end point. Alternatively or additionally, a position of the respective serration in the longitudinal direction of the rotor blade can also be used for weighting.

In an alternative embodiment, in order to obtain the average of the angles between the respective planes of the serrations and the profile chord of the rotor blade, each angle between the respective planes of the serrations and the profile chord of the rotor blade is weighted equally. In other words, the arithmetic mean of all angles between the respective planes of the serrations and the profile chord of the rotor blade is formed.

According to one advantageous embodiment of the rotor blade, the angle between the plane of at least one of the serrations and the profile chord of the rotor blade is formed in that
- the serration has a curvature between the location at which the serration is mounted on the rotor blade and any desired location on the serration, and/or
- the serration is mounted on a movable part of the rotor blade, wherein the movable part of the rotor blade can be adjusted in such a way that the angle between the serration and the profile chord of the rotor blade can be varied, and/or
- the serration has a hinge, wherein the hinge can be adjusted in such a way that the angle between the serration and the profile chord of the rotor blade can be varied, and/or
- the serration is mounted on the rotor blade in such a way that the angle between the plane of the serration and the profile chord of the rotor blade deviates from zero, preferably in that the surface of the rotor blade is not parallel to the profile chord of the rotor blade at the mounting point of the serration, and/or
- the serration is angled by compression, tension or stress, in particular in that a tension or compression mechanism acts on the serration in order to angle it.

The angle between the plane of at least one of the serrations and the profile chord of the rotor blade can preferably be formed in that, between the base line and any desired point of the serration—this point being located on the same side of the base line of the serration as the end point of the serration—the serration is not flat, i.e., has a curvature. The serration preferably includes a movable, angularly adjustable, rotatable and/or bendable part which is designed to adjust the angle between the plane of the serration and the profile chord of the rotor blade. Another example is the use of compression, tension or stress to form the angle between the plane of the serration and the profile chord of the rotor blade.

The serration is preferably angled by using a mechanical connection, with the possibility of passive or active control, between the serration and the rotor blade.

According to one preferred embodiment of the rotor blade, the lengths of the serrations, defined as the distance from the base line to the at least one end point, are formed as a function of the angle between at least one of the serrations and the profile chord of the rotor blade.

It is advantageous to make the serrations that are closer to the tip end of the rotor blade shorter than the serrations that are closer to the root end of the rotor blade. In particular, it is advantageous to reduce in steps the length of the serration which is located in a section in the outermost 30% of the rotor blade, with the shortest serration being located closest to the tip end of the rotor blade.

An advantageous length of the serrations is, preferably, between 50 and 400 millimeters.

It is particularly advantageous to select the length of the serrations as a function of the angle to be set, although the serrations which have a relatively large angle should not be made too long so that mechanical forces on the serrations are limited and do not damage them.

According to one preferred embodiment of the rotor blade, the angle between the plane of at least one of the serrations and the profile chord of the rotor blade can be adjusted during the operation of the rotor blade in a wind turbine.

It is advantageous to adjust the angle between the plane of at least one of the serrations and the profile chord of the rotor blade during operation in order to preferably still have the possibility of influencing the induction of the rotor blade even after the commissioning of the rotor blade, for example in order to meet limit values for sound emission at the highest possible power of the wind turbine.

The adjustment of the angle can be designed to be continuous or can have at least two angles that can be set in a defined manner, in particular can have more than 20 angles which can be set in a defined manner.

According to an alternative embodiment of the rotor blade, the angle between at least one of the serrations and the profile chord of the rotor blade can be adjusted as a function of at least one environmental parameter during the operation of the rotor blade in a wind turbine.

It is advantageous to adjust the angle between the plane of at least one of the serrations and the profile chord of the rotor blade during operation in order to optimize the angle preferably to the current environmental parameters. Furthermore, the angle is preferably to be optimized to predictable or expected values of the environmental parameters. The seasons are preferably indicative of values of the environmental parameters, with different values of the environmental parameters being predictable or to be expected in winter than in summer.

According to one preferred embodiment of the rotor blade, the angle between at least one of the serrations and the profile chord of the rotor blade can be adjusted as a function of the position in the longitudinal direction of the rotor blade in order to optimize the lift of the rotor blade as a function of the position, in the longitudinal direction of the rotor blade.

Adjustment of the angle between at least one of the serrations and the profile chord of the rotor blade as a function of the position, in the longitudinal direction of the rotor blade, allows position-dependent optimization of the induction of the rotor blade and preferably also makes possible adjustment of loads which act on the rotor blade. This is of particular interest if the rotor blade has lower load margins in at least one region of the rotor blade as a result of its structure or design than in other regions.

According to a preferred embodiment of the rotor blade, the induction distribution or the lift distribution of the rotor blade can be optimized in a manner dependent on the location by corresponding adjustment of the angle.

If the rotor blade does not have optimal induction at at least one position, for example because it is overinduced there, position-dependent optimization of the induction of the rotor blade by adjustment of the angle between at least one of the serrations and the profile chord of the rotor blade as a function of the position is advantageous.

According to one alternative embodiment of the rotor blade, the serrations are formed of fiber-reinforced plastic, in particular carbon- and glass-fiber-reinforced plastic, of plastic and/or of metal, or contain at least one of these materials.

Fiber-reinforced plastic, in particular carbon- and glass-fiber-reinforced plastic, as well as plastic and metal, are materials which can be used to advantage for serrations because they are strong and light.

According to one preferred embodiment of the rotor blade, the serrations are incorporated into the rotor blade, in particular the serrations are incorporated into the rotor blade with fiber-reinforced plastic, particularly preferably with carbon- or glass-fiber-reinforced plastic. As a particular preference, the serrations of one of these materials are laminated into the rotor blade.

Incorporating the serrations into the rotor blade is advantageous for the stability of the serrations and for the aerodynamics of the rotor blade since, in relation to the rotor blade, the serrations incorporated into the rotor blade do not exhibit any offsets or projecting edges at the transition from the rotor blade to the serration.

According to one alternative embodiment of the rotor blade, the rotor blade has, at the leading edge or in a section of the leading edge, an erosion protection layer, which is designed to lower the drag of the rotor blade.

An erosion protection layer makes it possible to reduce, preferably prevent, the erosion of the rotor blade, in particular by virtue of a surface made of a corrosion-resistant material. A corrosion-resistant material is understood, for example, to mean a material which corrodes less quickly than the material of which the rotor blade principally consists.

An erosion protection layer makes it possible, inter alia by virtue of a smooth surface and the low adhesion of contamination, to reduce the friction with the air and thus to boost the efficiency of the rotor blade, with the avoidance of erosion, in particular, ensuring a smooth surface of the rotor blade and thus low friction with the air and additionally longer durability of the rotor blade.

According to one alternative embodiment of the rotor blade, the rotor blade has the erosion protection layer in a section which, in the longitudinal direction of the rotor blade, is located in the outermost 30% of the rotor blade in the direction of the tip end of the rotor blade.

In the direction of the tip end of the rotor blade, the air speed increases relative to the rotor blade. This is because the drag, i.e., the frictional force, which a body moving relative to the air undergoes counter to the direction of movement is proportional to the square of the speed of the rotor blade relative to the air, wherein the speed of the rotor blade is dependent on the rotor blade position under consideration and increases in the direction of the tip end of the rotor blade.

Since the air speed relative to the rotor blade is greater at the tip end of the rotor blade than at the root end of the rotor blade, it is particularly advantageous to apply the erosion protection layer in a section in the direction of the tip end of the rotor blade. It is therefore advantageous that the erosion protection layer is applied in a region in the direction of the tip end of the rotor blade because it is there that the effect achieved, the reduction of drag, is greatest.

In a second aspect, a wind turbine is disclosed that comprises at least one rotor blade according to the first aspect of the present disclosure or a preferred embodiment of the rotor blade.

The wind turbine can comprise any desired number of rotor blades which is greater than or equal to one, wherein at least one of the rotor blades comprises the rotor blade according to the disclosure or a preferred embodiment of the rotor blade.

According to one preferred embodiment of the wind turbine, the wind turbine has a controller, wherein the controller is designed to adapt at least one operating point of the wind turbine as a function of the angle between at least one of the serrations and the profile chord of the rotor blade.

An operating point of the wind turbine can preferably include a pitch angle or a rotational speed of the rotor blade.

When changing the angle between at least one of the serrations and the profile chord of the rotor blade, it is thus advantageous to adapt at least one operating point of the wind turbine as a function of the angle between at least one of the serrations and the profile chord of the rotor blade in order to optimize the wind turbine, preferably in order to optimize the power and/or the sound emissions thereof.

According to one alternative embodiment of the wind turbine, the operating point comprises a rotational speed and/or a pitch characteristic.

In a third aspect, a wind farm is disclosed which comprises a plurality of wind turbines, wherein at least one of these wind turbines is designed in accordance with the second aspect of the present disclosure.

In a fourth aspect, a method for optimizing a rotor blade is disclosed, wherein the rotor blade has a leading edge and a trailing edge and extends in the longitudinal direction of the rotor blade between a root end and a tip end, wherein a direct connection between the leading edge and the trailing edge is referred to as a profile chord, comprising:

mounting of serrations in the region of the trailing edge of the rotor blade, wherein each of the serrations has a base line, which is arranged at the trailing edge, and an end point, which is furthest away from the base line, which together span a plane of the serration, characterized in that, in the mounting step, an angle between the plane of at least one of the serrations and the profile chord of the rotor blade is formed as a function of at least one environmental parameter at the installation location of the wind turbine.

The time at which the step of mounting the serration takes place is not decisive. The step of mounting the serration can take place before the rotor blade is commissioned and also after the rotor blade has been commissioned.

According to one alternative embodiment, the method for optimizing a rotor blade comprises optimizing at least one serration, which has a hinge, characterized in that the hinge is adjusted passively and/or actively, in particular by means of a motor, so that an angle between the plane of at least one of the serrations and the profile chord of the rotor blade is formed as a function of at least one environmental parameter at the installation location of the wind turbine.

The hinge is preferably designed as a flap hinge or as a rolled hinge or as a piano hinge or as a cup hinge. Passive adjustment of the hinge is preferably possible by means of a mechanical fastening mechanism, which can preferably be set to a movable or an immovable state. Active adjustment of the hinge is preferably possible by means of a motor, with adjustment of the hinge being possible even during operation of the rotor blade. Active adjustment of the hinge is also possible when the rotor blade is not in operation, for example before the commissioning of the rotor blade.

It is advantageous that a serration has a hinge because this makes it easy to adjust the angle between the plane of the serration and the profile chord of the rotor blade. Active adjustment of the hinge makes it possible to continuously adjust the angle between the plane of the serration and the profile chord of the rotor blade and thus makes it possible to continuously adapt to the environmental parameters at the installation location of the wind turbine, making it possible in turn to continuously optimize the performance of the rotor blade and thus increasing the yield of the wind turbine.

According to one preferred embodiment, the method for optimizing a rotor blade comprises adjusting the angle between at least one of the serrations and the profile chord of the rotor blade as a function of the position, in the longitudinal direction of the rotor blade, in order to optimize the induction of the at least one region of the rotor blade in at least one region of the rotor blade, as a function of at least one environmental parameter at the installation location of the wind turbine.

The adjustment of the angle between at least one of the serrations and the profile chord of the rotor blade as a function of the position, in the longitudinal direction of the rotor blade, makes possible position-dependent change, or adjustment, or optimization, of the induction of the rotor blade. This position-dependent optimization, or adjustment, or change, of the induction of the rotor blade makes it possible to optimize the induction of the rotor blade, which can be better adapted to the given properties of the rotor blade.

The main concept here is that the induction of the rotor blade between the root end and the tip end can be adapted or optimized locally by means of the set angle at any point at which a serration is arranged. This is made possible by the add-on parts, e.g., the serrations, in a manner dependent on the location, e.g., by different radial extent, geometry and/or by the adjustment of the angle.

According to one preferred embodiment, the method for optimizing a rotor blade comprises adjusting the angle between at least one of the serrations and the profile chord of the rotor blade as a function of the position, in the longitudinal direction of the rotor blade, in order to avoid incorrect local induction of the rotor blade in the case of environmental parameters which deviate from design conditions.

A rotor blade is generally configured or designed for specific environmental parameters. Even if, in exceptional cases, a rotor blade was not configured or designed for specific environmental parameters, such a rotor blade exhibits determinable values of environmental parameters for which the properties, or the induction, of the rotor blade are best. These determinable values, which are determinable, for example, by simulating and optimizing the rotor blade using the blade element method, for example with varying air density, or by measuring it in a wind tunnel, are regarded as the environmental parameters for which the rotor blade was configured or designed. For environmental parameters that deviate from the environmental parameters for which the rotor blade was configured or designed, the properties, or the induction, of the rotor blade deteriorate. This can lead to a local deviation from the optimum induction of the rotor blade. The elimination of an incorrect local induction of the rotor blade preferably increases the yield of the rotor blade and/or the stability of the induction of the rotor blade for varying wind strengths. Incorrect induction is induction which deviates from the optimum induction according to Betz's theory.

According to one alternative embodiment, a method for operating a wind turbine with a rotor blade according to the first aspect of the present disclosure or a preferred embodiment of the rotor blade comprises the step of:

adapting at least one operating point of the wind turbine as a function of the angle between at least one of the serrations and the profile chord of the rotor blade.

According to a preferred embodiment, the method for servicing a rotor blade according to the first aspect of the present disclosure or for servicing a preferred embodiment of the rotor blade or for servicing a wind turbine according to the second aspect of the present disclosure or for servicing a preferred embodiment of the wind turbine or for servicing a wind farm according to the third aspect of the present disclosure, wherein serrations are arranged in the region of the trailing edge of the rotor blade of at least one wind turbine, wherein each of the serrations has a base line, which is arranged at the trailing edge, and an end point, which is furthest away from the base line, which together span a plane of the serration, the method comprising the following step:

adapting an angle between the plane of at least one of the serrations and the profile chord of the rotor blade as a function of at least one environmental parameter at the installation location of the wind turbine.

The base line can be recorded for a brush component. The brush does not have a base line.

BRIEF DESCRIPTION OF THE SEVERAL VIEWS OF THE DRAWINGS

Further advantages and special embodiments are described below with reference to the appended figures. Here.

DETAILED DESCRIPTION

Figure 1:
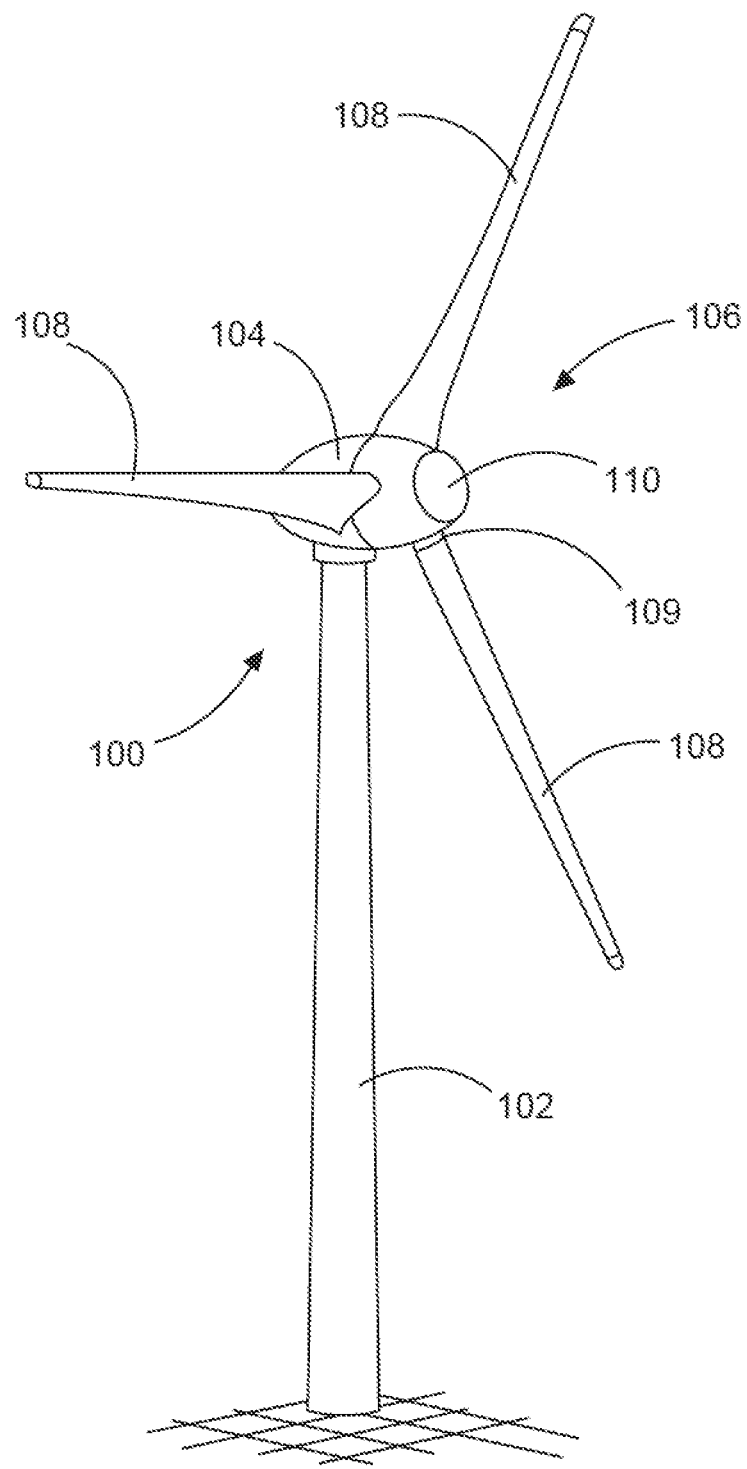
FIG. 1 shows a schematic illustration of a wind turbine according to the invention.

FIG. 1 shows a schematic illustration of a wind turbine 100 according to the invention. The wind turbine 100 has a tower 102 and a nacelle 104 on the tower 102. An aerodynamic rotor 106 with three rotor blades 108 and a spinner 110 is provided on the nacelle 104. During the operation of the wind turbine, the aerodynamic rotor 106 is caused to rotate by the wind and thus also rotates an electrodynamic rotor or runner of a generator, which is coupled directly or indirectly to the aerodynamic rotor 106. The electric generator is arranged in the nacelle 104 and generates electric energy. The pitch angles of the rotor blades 108 can be changed by pitch motors at the rotor blade roots 109 of the respective rotor blades 108.

Figure 2:
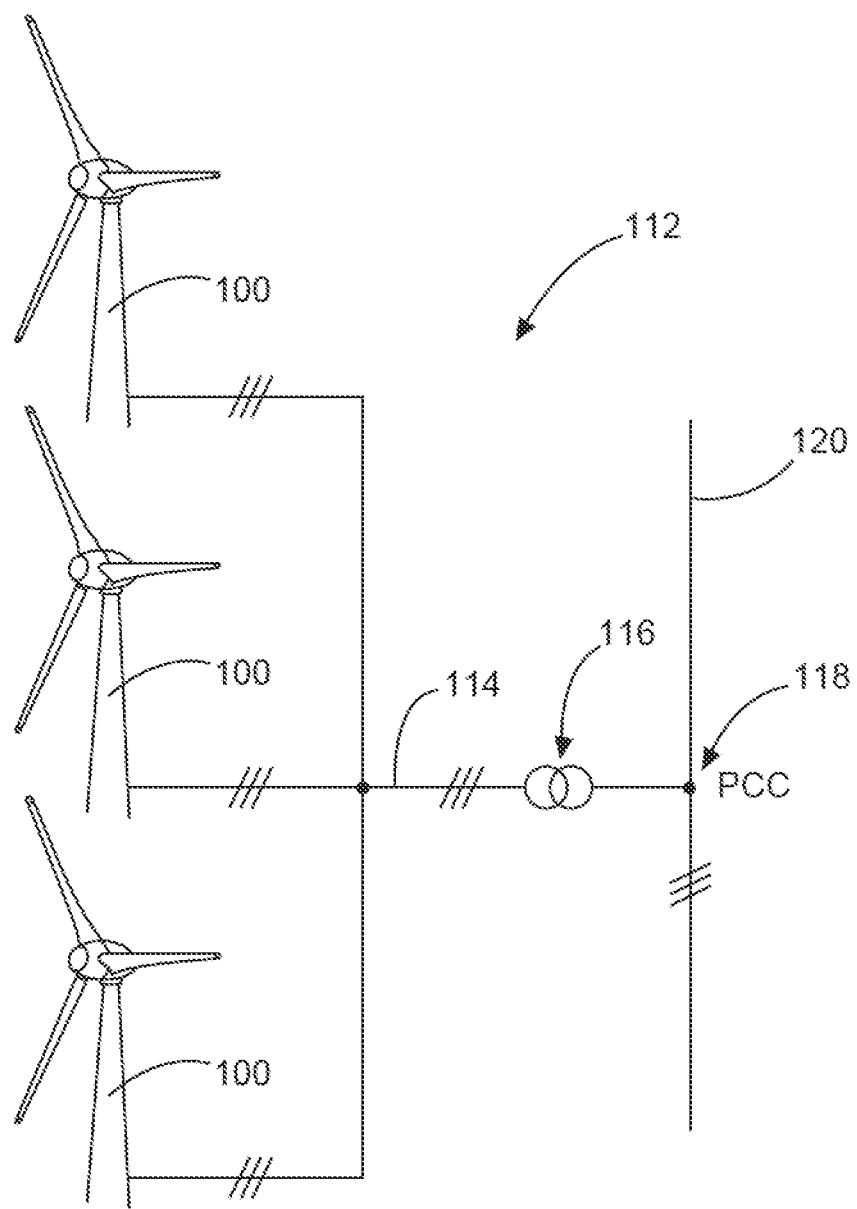
FIG. 2 shows a wind farm with, for example, three wind turbines.

FIG. 2 shows a wind farm 112 with, for example, three wind turbines 100, which may be the same or different. The three wind turbines 100 are thus representative of basically any desired number of wind turbines of a wind farm 112. The wind turbines 100 provide their power, namely in particular the generated current, via an electric farm network 114. In this case, the currents or powers generated in each case by the individual wind turbines 100 are summed, and a transformer 116 is usually provided, which steps up the voltage in the farm in order then to feed it into the supply network 120 at the feed-in point 118, which is also generally referred to as the PCC. FIG. 2 is only a simplified illustration of a wind farm 112. For example, the farm network 114 can be configured differently, in that, for example, a transformer is also present at the output of each wind turbine 100, to mention only one other exemplary embodiment.

Figure 3:
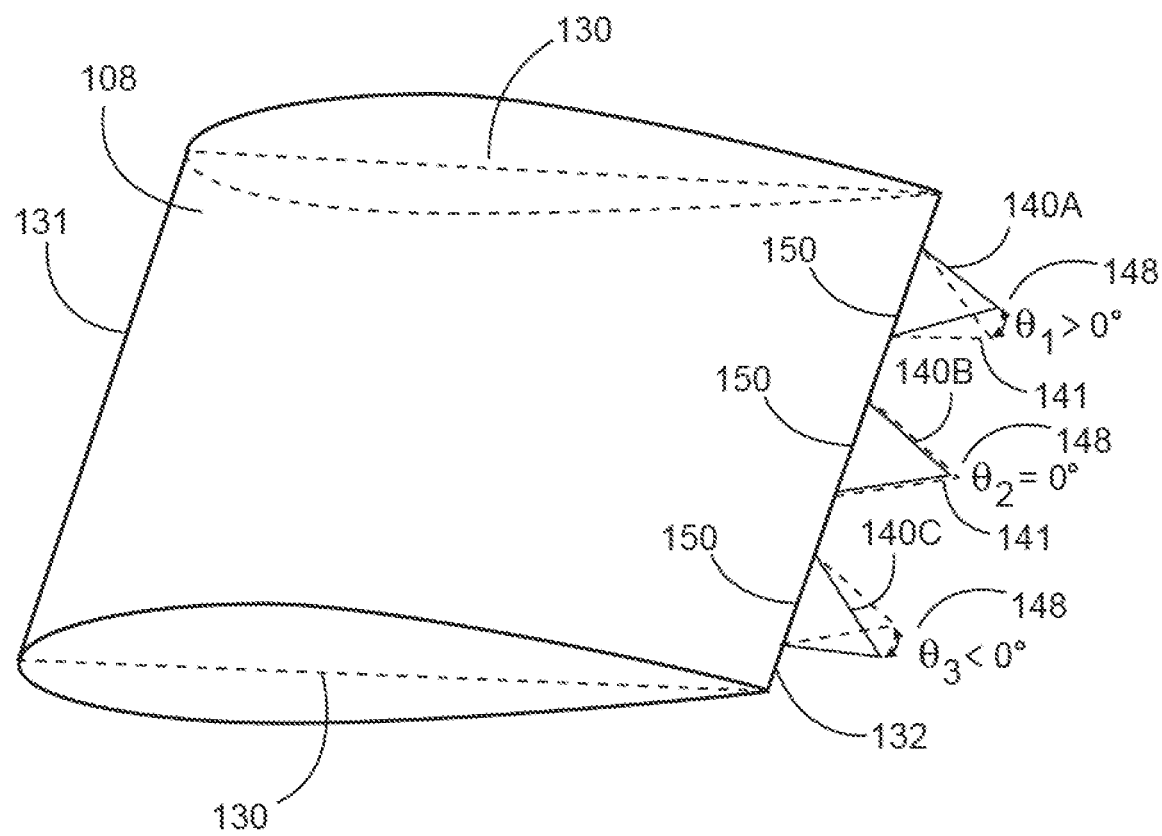
FIG. 3 shows a schematic illustration of a cross-section of a rotor blade with serrations which exhibit an angle to the profile chord.

FIG. 3 shows a schematic illustration of a cross-section of the rotor blade 108 with serrations 140A, B, C, which are arranged at different angles "θ" on a rotor blade 108.

Each serration 140 has a base line 150, which is arranged at the trailing edge. Opposite the trailing edge 132 is the leading edge 131, between which the profile chord 130 extends.

Of course, the number of serrations is only illustrative; it is also possible to install more or fewer serrations, and any desired geometry can also be chosen. For example, it is also possible for no distance or a greater distance to be formed between the serrations 140 along the trailing edge. Each of the serrations 140 can be at an angle 148 to its associated local profile chord 130, and this angle is also indicated by "θ" in the drawings. For the respective serration 140, this angle "θ" is the angle which the serration 140 has to a plane which is spanned by the trailing edge 132 and the profile chord 130.

The serrations 141 shown in dashed lines are illustrated for purposes of orientation and represent the projection of the serrations 140 onto this plane ("reference plane").

It can be seen that the angle $\theta_1$ of the serration 140A is greater than 0 degrees, i.e., the corresponding serration is angled in the direction of the suction side. The angle $\theta_2$ is equal to 0 degrees, that is to say that the serration 140B lies exactly in the plane of the serration 141 illustrated in dashed lines. Finally, the angle $\theta_3$ is less than 0 degrees, that is to say the serration 140C is angled in the direction of the pressure side. The different angles allow local adaptation of the induction factor distribution, which ultimately contributes to an improved rotor blade, which is also described below with reference to the other figures.

Figure 4:
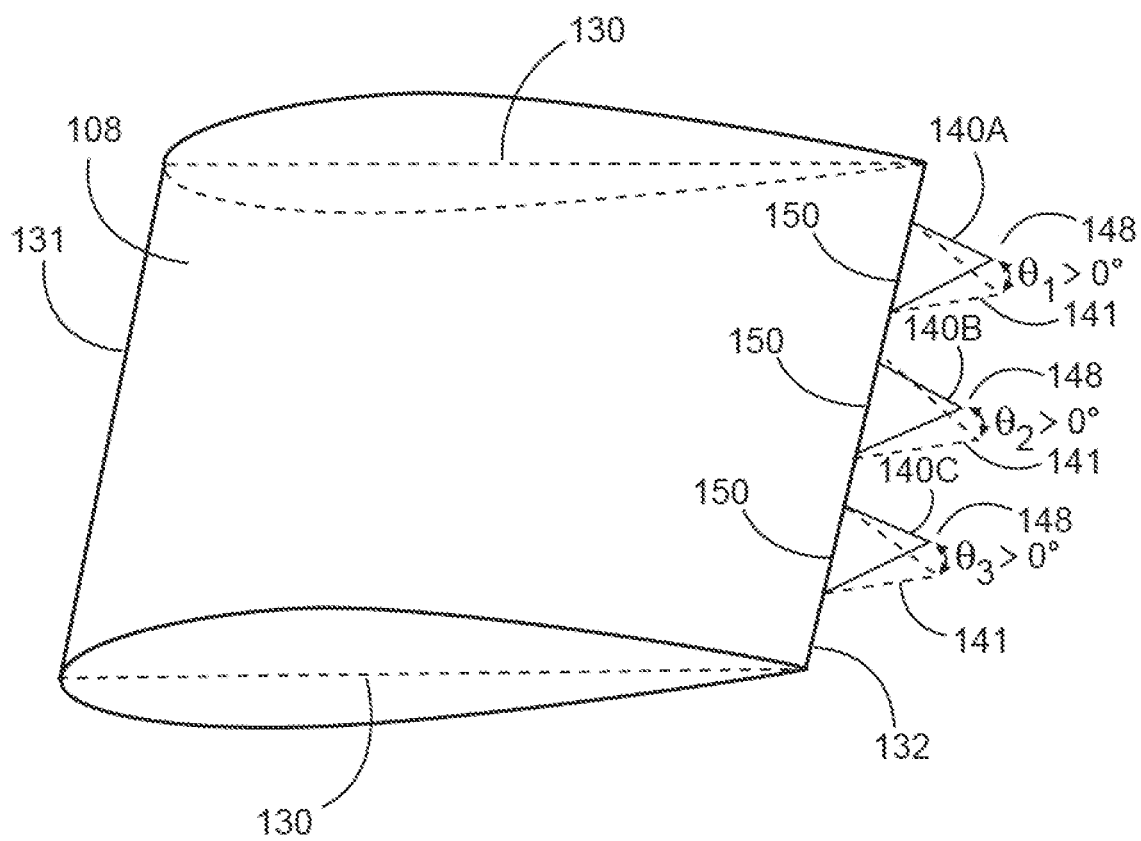
FIG. 4 shows a schematic illustration of a cross-section of the rotor blade with serrations which exhibit different angles than in FIG. 3.

Like FIG. 3, FIG. 4 shows a schematic illustration of a cross-section of the rotor blade 108 with serrations 140 A, B, C, which exhibit angles 148. FIG. 4 differs from FIG. 3 in that another possible embodiment of the angles 148 of the serrations 140 is shown, namely all the angles $\theta_1$, $\theta_2$ and $\theta_3$ are smaller than 0 degrees and are accordingly angled towards the pressure side.

Figure 5:
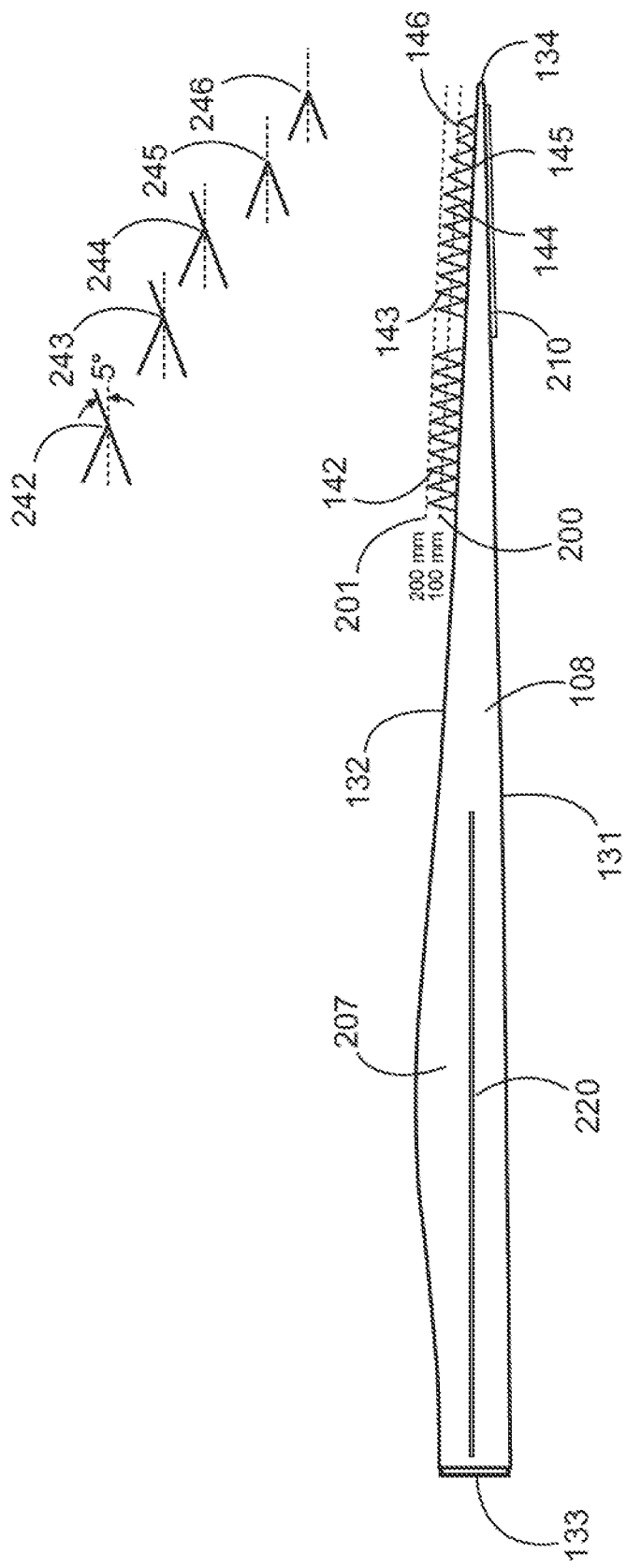
FIG. 5 shows a schematic illustration of the rotor blade that exhibits serrations with various lengths and angles.

FIG. 5 shows a schematic illustration of the rotor blade. The rotor blade has serrations 142-146, also frequently referred to as trailing edge serrations (TES), which can also be embodied, for example, like the serrations 140 shown in FIGS. 3 and 4. These serrations 142-146 can advantageously be mounted on the rotor blade 108 at an angle, cf. also FIGS. 3 and 4, between the plane which is spanned by the trailing edge 132 and the profile chord, and the serrations 142-146.

From FIG. 5 it can be seen that, for the serrations 142, a sketch shows the profile of the rear part 242 of the rotor blade 108 at the position of the serrations 142. On the sketch of the profile of the rear part 242 of the rotor blade 108, it can be seen that the serrations 142 are formed at an angle of 5 degrees in the direction of a suction side 207 of the rotor blade 108.

The serrations 142 have a length of 200 millimeters, for example, this being shown by the dashed line 201, which indicates a length of 200 millimeters.

For the serrations 143, a sketch of the profile of the rear part 243 of the rotor blade 108 at the position of the serrations 143 is shown. On the sketch of the profile of the rear part 243 of the rotor blade 108, it can be seen that the serrations 143 have a positive angle in the direction of the suction side 207 of the rotor blade 108.

The serrations 143 likewise have a length of 200 millimeters, for example, this being shown by the dashed line 201, which indicates a length of 200 millimeters.

For the serrations 144, a sketch of the profile of the rear part 244 of the rotor blade 108 at the position of the serrations 144 is shown. On the sketch of the profile of the rear part 244 of the rotor blade 108 it can be seen that the serrations 144 likewise have a positive angle in the direction of the suction side 207 of the rotor blade 108.

The serrations 144 have a length of, for example, 150 millimeters, which can be seen from the dashed line 201, which indicates a length of 200 millimeters, and the dashed line 200, which indicates a length of 100 millimeters. They are therefore shorter than the serrations 142 and 143.

For the serrations 145, a sketch of the profile of the rear part 245 of the rotor blade 108 at the position of the serrations 145 is shown. On the sketch of the profile of the rear part 245 of the rotor blade 108 it can be seen that the serrations 145 have an angle of 0 degrees. They are therefore angled differently with respect to the profile chord in comparison with the other serrations 142, 143 and 144.

The serrations 145 have a length of, for example, 120 millimeters, which can be seen from the dashed line 201, which indicates a length of 200 millimeters, and the dashed line 200, which indicates a length of 100 millimeters. The serrations 145 are therefore shortened again with respect to the serrations 144.

For the serrations 146, a sketch of the profile of the rear part 246 of the rotor blade 108 at the position of the serrations 146 is shown. On the sketch of the profile of the rear part 246 of the rotor blade 108 it can be seen that the serrations 146 have an angle of 0 degrees. The serrations 146 have a length of, for example, 100 millimeters, which can be seen from the dashed line 200, which indicates a length of 100 millimeters.

In particular, it is advantageous to reduce in steps the length of the serrations 142-146 which are located in a certain section of the rotor blade, said section being located in the outermost 30% of the rotor blade 108 for example, with the shortest serration 146 being located closest to the tip end 134 of the rotor blade 108. An advantageous length of the serrations 142-146 is between 50 and 400 millimeters, for example.

The rotor blade preferably has vortex generators 220 in a region from the root end 133 of the rotor blade 108 to half the distance to the tip end 134 of the rotor blade 108. FIG. 5 is only a simplified illustration of a rotor blade.

Figure 6:
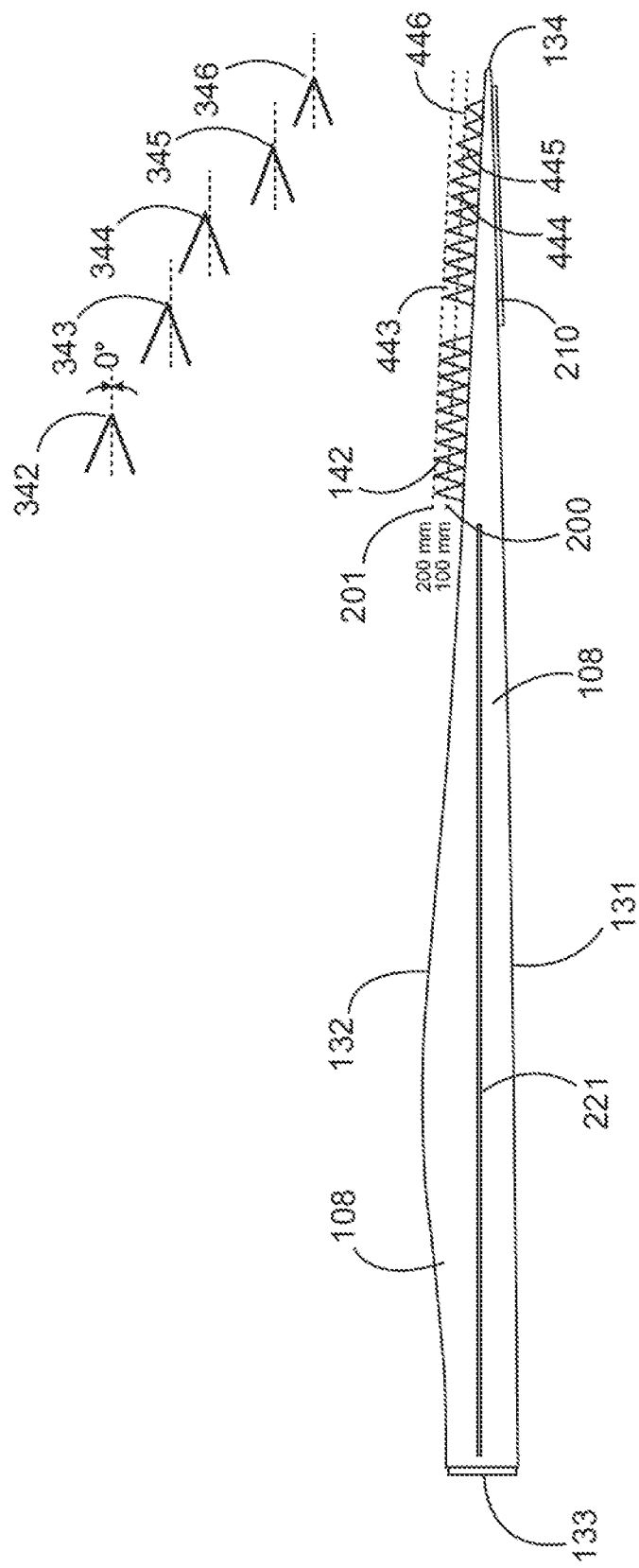
FIG. 6 shows a schematic illustration of the rotor blade which shows serrations in another embodiment with various lengths and constant angles.

FIG. 6 shows schematically and by way of example another rotor blade 108, in which the serrations are adapted to other environmental parameters when compared with the rotor blade shown in FIG. 5.

The angles of the serrations 442-443 differ from the angles of the serrations 142-143 of FIG. 5, wherein the angles of the serrations 442-443 have a smaller absolute value, which is shown on the sketches of the profiles of the rear parts 342-343 of the rotor blade 108 at the position of the serrations 442-443. In addition or as an alternative, the length of the serrations 444-446 can differ from the length of the serrations 144-146 of FIG. 5, the serrations 444-446 being longer.

Furthermore, FIG. 6 shows that the vortex generators 220 extend over a greater distance in the direction of the tip end 134 of the rotor blade in the longitudinal direction of the rotor blade. They therefore extend over a larger range in the longitudinal direction of the rotor blade. By this means too, it is possible to adapt the rotor blade to environmental parameters without the need to make structural changes to the rotor blade.

A combination of one, two or all of the measures a) adaptation of the angle of the serrations, b) adaptation of the length of the serrations and/or c) adaptation of the extent of the vortex generators in the longitudinal direction of the rotor blade is therefore advantageous in order to compensate for deviations between the environmental parameters on which the design is based and the environmental parameters at the installation location of the wind turbine and to optimize the yield of the rotor blade or wind turbine almost independently of the actual environmental parameters.

On the basis of these differences from the configuration of the rotor blade of FIG. 5, the rotor blade 108 of FIG. 6 is optimized for lower air densities, for example, as a specific example of specific environmental parameters at the installation location of the wind turbine.

Figure 7:
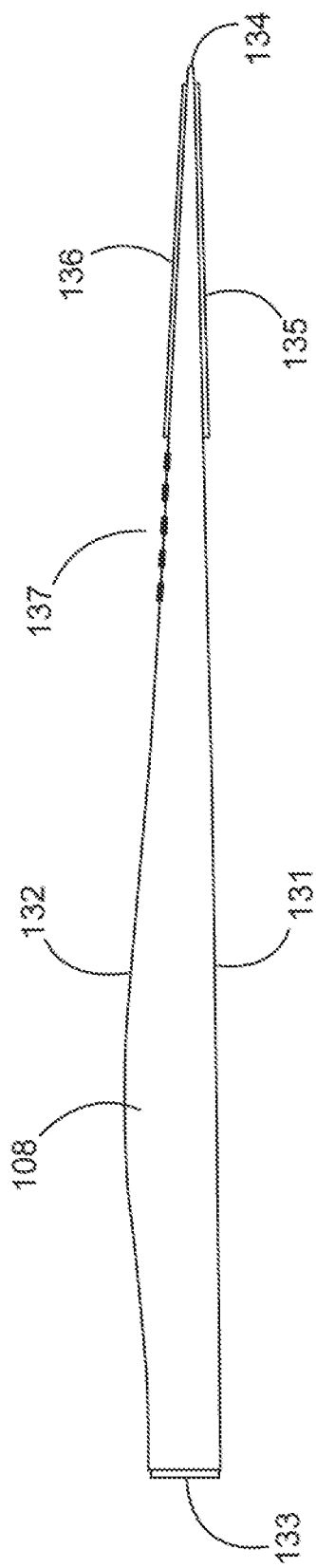
FIG. 7 shows a schematic illustration of the rotor blade.

FIG. 7 shows a schematic illustration of another rotor blade. In addition or as an alternative to the adaptations of the rotor blades 108 of FIGS. 5 and 6, the rotor blade 108 of FIG. 7 has a region of serrations 136, 137 that is variable in longitudinal extent. In this case, either serrations are present or not present in the region of serrations 137 which is depicted by a dashed line, preferably depending on at least one environmental parameter. It is also possible to provide a plurality of gradations or intermediate values of the extent of the serrations. In this way, the longitudinal extent of the serrations can also be used to achieve even more precise adaptation of the rotor blade to the environmental parameters at the installation location.

The rotor blade 108 furthermore has an erosion protection layer 135, which is shown schematically in FIG. 7 by means of a line. In its extent in the longitudinal direction of the rotor blade 108, this erosion protection layer 135 too is preferably selected in accordance with environmental parameters.

In the illustrated embodiments, the angles θ of the serrations are generally achieved by providing a deflection of the serrated part of the serration with regard to the base plate, i.e., by providing a rather sharp angle of the serrated part with regard to the base plate. However, in other embodiments, a curved shape having a large radius can be provided such that no sharp angle or edge of the deflection is formed. In this embodiment, the angle θ of the serration can be defined as an average angle of the serrated portion of the serration.

In other embodiments, the curvature of the serration can also change over the extension or length of the serration. For example, the camber of the serration can increase starting from the base edge in the beginning and then relieve in the vicinity of the tip of the serration. The curvature change can be both steady or discontinuous.

Exemplary Embodiments

1. Rotor blade (108) of a wind turbine (100), wherein the rotor blade (108) has a leading edge (131) and a trailing edge (132) and extends in a longitudinal direction of the rotor blade between a root end (133) and a tip end (134), wherein a direct connection between the leading edge (131) and the trailing edge (132) is referred to as a profile chord (130), wherein the rotor blade (108) has serrations (136-137, 140-146, 442-446) in the region of the trailing edge (132) at least in some section or sections, wherein each of the serrations (136-137, 140-146, 442-446) has a base line (150), which is arranged at the trailing edge (132), and an end point, which is furthest away from the base line (150), which together span a plane of the serration (136-137, 140-146, 442-446), characterized in that an angle (148) between the plane of at least one of the serrations (136-137, 140-146, 442-446) and the profile chord (130) of the rotor blade (108) is formed as a function of at least one environmental parameter at the installation location of the wind turbine (100).

2. Rotor blade (108) according to exemplary embodiment 1, wherein the at least one environmental parameter at the installation location of the wind turbine (100) includes one or more parameters which are indicative of air density, air humidity, temperature, air pressure, air pollution, turbulence or turbulence intensity, shear, and/or wind speed.

3. Rotor blade (108) according to exemplary embodiment 2, wherein the parameter comprises an extreme value, an average value and/or a variance of the air density, air humidity, temperature, air pressure, air pollution, turbulence or turbulence intensity, shear, and/or wind speed.

4. Rotor blade (108) according to any of the preceding exemplary embodiments, wherein the angle (148) between the plane of in each case one of the serrations (136-137, 140-146, 442-446) and the profile chord (130) of the rotor blade (108) is different for at least two of the serrations (136-137, 140-146, 442-446).

5. Rotor blade (108) according to any of the preceding exemplary embodiments, wherein the angle (148) between the plane of at least one of the serrations (136-137, 140-146, 442-446) and the profile chord (130) of the rotor blade (108) is formed as a function of the at least one environmental parameter and additionally as a function of the mounting position of the relevant serration (136-137, 140-146, 442-446) in the longitudinal direction of the rotor blade.

6. Rotor blade (108) according to any of the preceding exemplary embodiments, wherein in the event of a deviation from the design air density at the installation location, the angle (148) between the plane of in each case one of the serrations (136-137, 140-146, 442-446) and the profile chord (130) of the rotor blade (148) has an absolute value greater than 0 degrees for at least one of the serrations (136-137, 140-146, 442-446).

7. Rotor blade (108) according to any of the preceding exemplary embodiments, wherein the environmental parameter comprises an extreme value, an average value and/or a variance of the air density, and wherein the angle (148) between the plane of at least one of the serrations (136-137, 140-146, 442-446) and the profile chord (130) of the rotor blade (108) increases in the direction of the pressure side with decreasing air density.

8. Rotor blade (108) according to any of the preceding exemplary embodiments, wherein the angle (148) is more than 0 degrees, preferably more than 4 degrees, in the direction of the pressure side at a low air density which is below the design air density by at least a threshold value, in particular at least 0.075 kg/m$^3$ below the design air density.

9. Rotor blade (108) according to any of the preceding exemplary embodiments, wherein an average of the angles (148) between the respective planes of the serrations (136-137, 140-146, 442-446) and the profile chord (130) of the rotor blade (108) at an air density, at the installation location of the rotor blade (108), which is equal to or less than the design air density, is greater in the direction of the pressure side than the average angle (148) between the respective planes of the serrations (136-137, 140-146, 442-446) and the profile chord (130) of the same rotor blade (108) which has, however, been optimized for an air density above the design air density.

10. Rotor blade (108) according to any of the preceding exemplary embodiments, wherein the angle (148) between the plane of at least one of the serrations (136-137, 140-146, 442-446) and the profile chord (130) of the rotor blade (108) is formed in that the serration (136-137, 140-146, 442-446) has a curvature between the location at which the serration (136-137, 140-146, 442-446) is mounted on the rotor blade (108) and any desired location on the serration (136-137, 140-146, 442-446), and/or the serration (136-137, 140-146, 442-446) is mounted on a movable part of the rotor blade (108), wherein the movable part of the rotor blade (108) can be adjusted in such a way that the angle (148) between the serration (136-137, 140-146, 442-446) and the profile chord (130) of the rotor blade (108) can be varied, and/or the serration (136-137, 140-146, 442-446) has a hinge, wherein the hinge can be adjusted in such a way that the angle (148) between the serration (136-137, 140-146, 442-446) and the profile chord (130) of the rotor blade (108) can be varied, and/or the serration (136-137, 140-146, 442-446) is mounted on the rotor blade (108) in such a way that the angle (148) between the plane of the serration (136-137, 140-146, 442-446) and the profile chord (130) of the rotor blade (108) deviates from zero, preferably in that the surface of the rotor blade (108) is not parallel to the profile chord (130) of the rotor blade (108) at the mounting point of the serration (136-137, 140-146, 442-446), and/or the serration (136-137, 140-146, 442-446) is angled by compression, tension or stress, in particular in that a tension or compression mechanism acts on the serration (136-137, 140-146, 442-446) in order to angle it.

11. Rotor blade (108) according to any of the preceding exemplary embodiments, wherein the lengths of the serrations (136-137, 140-146, 442-446), defined as the distance from the base line (150) to the at least one end point, are formed as a function of the angle (148) between at least one of the serrations (136-137, 140-146, 442-446) and the profile chord (130) of the rotor blade (108).

12. Rotor blade (108) according to any of the preceding exemplary embodiments, wherein the angle (148) between the plane of at least one of the serrations (136-137, 140-146, 442-446) and the profile chord (130) of the rotor blade (108) can be adjusted during the operation of the wind turbine (100).

13. Rotor blade (108) according to any of the preceding exemplary embodiments, wherein the angle (148) between at least one of the serrations (136-137, 140-146, 442-446) and the profile chord (130) of the rotor blade (108) can be adjusted as a function of at least one environmental parameter during the operation of the wind turbine (100).
14. Rotor blade (108) according to any of the preceding exemplary embodiments, wherein the angle (148) between at least one of the serrations (136-137, 140-146, 442-446) and the profile chord (130) of the rotor blade (108) can be adjusted as a function of the mounting position in the longitudinal direction of the rotor blade in order to optimize the lift of the rotor blade (108) as a function of the position, in the longitudinal direction of the rotor blade.
15. Rotor blade (108) according to embodiment 14, wherein the induction distribution of the rotor blade (108) can be optimized in a manner dependent on the location, by corresponding adjustment of the angle (148).
16. Rotor blade (108) according to any of the preceding exemplary embodiments, wherein the serrations (136-137, 140-146, 442-446) are formed of fiber-reinforced plastic, in particular carbon- and glass-fiber-reinforced plastic, of plastic and/or of metal.
17. Rotor blade (108) according to any of the preceding exemplary embodiments, wherein the serrations (136-137, 140-146, 442-446) are incorporated into the rotor blade (108), in particular by being incorporated or laminated into the rotor blade (108) with fiber-reinforced plastic.
18. Wind turbine (100) having at least one rotor blade (108) according to one of the preceding exemplary embodiments.
19. Wind turbine (100) according to embodiment 18, wherein the wind turbine (100) has a controller, wherein the controller is designed to adapt at least one operating point of the wind turbine (100) as a function of the angle (148) between at least one of the serrations (136-137, 140-146, 442-446) and the profile chord (130) of the rotor blade (108).
20. Wind turbine (100) according to embodiment 19, wherein the operating point comprises a rotational speed and/or a pitch characteristic.
21. Wind farm having a plurality of wind turbines (100) according to any of embodiments 18 to 20.
22. Method for optimizing a rotor blade (108), wherein the rotor blade (108) has a leading edge (131) and a trailing edge (132) and extends in the longitudinal direction of the rotor blade between a root end (133) and a tip end (134), wherein a direct connection between the leading edge (131) and the trailing edge (132) is referred to as a profile chord (130), comprising: mounting of serrations (136-137, 140-146, 442-446) in the region of the trailing edge (132) of the rotor blade (108), wherein each of the serrations (136-137, 140-146, 442-446) has a base line (150), which is arranged at the trailing edge (132), and an end point, which is furthest away from the base line (150), which together span a plane of the serration (136-137, 140-146, 442-446), characterized in that, in the mounting step, an angle (148) between the plane of at least one of the serrations (136-137, 140-146, 442-446) and the profile chord (130) of the rotor blade (108) is formed as a function of at least one environmental parameter at the installation location of the wind turbine (100).
23. Method according to embodiment 22, comprising optimizing at least one serration (136-137, 140-146, 442-446), which has a hinge, characterized in that the hinge is adjusted passively and/or actively, in particular by means of a motor, so that an angle (148) between the plane of at least one of the serrations (136-137, 140-146, 442-446) and the profile chord (130) of the rotor blade (108) is formed as a function of at least one environmental parameter at the installation location of the wind turbine (100).
24. Method according to one of embodiments 22 or 23, wherein the angle (148) between at least one of the serrations (136-137, 140-146, 442-446) and the profile chord (130) of the rotor blade (108) is adjusted as a function of the position, in the longitudinal direction of the rotor blade, in order, in at least one region of the rotor blade (108), to optimize the induction of the at least one region of the rotor blade (108) as a function of at least one environmental parameter at the installation location of the wind turbine (100).
25. Method according to embodiment 24, wherein the angle (148) between at least one of the serrations (136-137, 140-146, 442-446) and the profile chord (130) of the rotor blade (108) is adjusted as a function of the position, in the longitudinal direction of the rotor blade, in order to avoid an incorrect local induction of the rotor blade (108) in the case of environmental parameters which deviate from design conditions.
26. Method of operating a wind turbine (100) having a rotor blade (108) according to any of the preceding claims 1 to 17, comprising the step of adapting at least one operating point of the wind turbine (100) as a function of the angle (148) between at least one of the serrations (136-137, 140-146, 442-446) and the profile chord (130) of the rotor blade (108).
27. Method for servicing a rotor blade (108) according to any of embodiments 1 to 17 or a wind turbine (100) according to any of embodiments 18 to 20 or a wind farm according to embodiment 21, wherein serrations (136-137, 140-146, 442-446) are arranged in the region of the trailing edge (132) of the rotor blade (108) of at least one wind turbine, wherein each of the serrations (136-137, 140-146, 442-446) has a base line (150), which is arranged at the trailing edge (132), and an end point, which is furthest away from the base line (150), which together span a plane of the serrations (136-137, 140-146, 442-446), wherein the method has the following step: adapting an angle (148) between the plane of at least one of the serrations (136-137, 140-146, 442-446) and the profile chord (130) of the rotor blade (108) as a function of at least one environmental parameter at the installation location of the wind turbine (100).

LIST OF REFERENCE SIGNS

100 wind turbine
102 tower
104 nacelle
106 rotor
108 rotor blade
109 rotor blade root
110 spinner
112 wind farm
114 farm network
116 transformer
118 feed point
120 supply network
130 profile chord
131 leading edge
132 trailing edge 133 root end
134 tip end
135 erosion protection layer
136-137 serration
140-146 serration
148 angle
150 base line
200-201 dashed line
207 suction side
220 vortex generator
242-246 rear part (of the rotor blade)
342-346 rear part (of the rotor blade)
442-446 serration The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade of a wind turbine comprising:
   a rotor blade body having a leading edge and a trailing edge, the rotor blade body extending in a longitudinal direction between a root end and a tip end,
   wherein a cross section of rotor blade body between the leading edge and the trailing edge defines a profile chord,
   wherein the rotor blade has a plurality of serrations formed by teeth of a trailing edge ridge of the rotor blade,
   wherein each serration of the plurality of serrations has a base line arranged at the trailing edge, and an end point, which is located furthest away from the base line, which together span a plane of the serration,
   wherein an angle between the plane of at least one serration of the plurality of serrations and the profile chord is formed dependent on at least one environmental parameter at an installation location of the wind turbine, and
   wherein the angle between the plane of the at least one serration of the plurality of serrations and the profile chord is increased in the direction of a pressure side of the rotor blade as the air density decreases thereby adjusting an induction factor distribution of the rotor blade according to deviations of the at least one environmental parameter at the installation location from at least one design parameter of the rotor blade.

2. The rotor blade according to claim 1, wherein the at least one environmental parameter at the installation location of the wind turbine includes one or more parameters chosen from air density, air humidity, temperature, air pressure, air pollution, turbulence or turbulence intensity, shear, and wind speed, wherein the at least one environmental parameter comprises a value chosen from an extreme value, an average value, and a variance of the air density, air humidity, temperature, air pressure, air pollution, turbulence or turbulence intensity, shear, and wind speed, wherein an extreme value is a high value or a low value within past 5 years.

3. The rotor blade according to claim 1, wherein the respective angles between the planes of the plurality of serrations and the profile chord is different for at least two serrations of the plurality of serrations.

4. The rotor blade according to claim 1, wherein the angle between the plane of at least one serration of the plurality of serrations and the profile chord is dependent on the at least one environmental parameter and a mounting position of the respective serration in the longitudinal direction of the rotor blade.

5. The rotor blade according to claim 1, wherein in an event of a deviation from a design air density at the installation location, the angle between the plane of in each case one serration of the plurality of serrations and the profile chord has an absolute value greater than 0 degrees for at least one serration of the plurality of serrations.

6. The rotor blade according to claim 1, wherein the environmental parameter comprises an extreme value, an average value, and/or a variance of the air density, and wherein the angle between the plane of at least one serration of the plurality of serrations and the profile chord increases in the direction of the pressure side with decreasing air density.

7. The rotor blade according to claim 6, wherein the angle is more than 4 degrees in the direction of the pressure side at an air density that is less than 0.075 kg/m$^3$.

8. The rotor blade according to claim 1, wherein an average of the angles between the respective planes of the plurality of serrations and the profile chord at an air density at the installation location, which is equal to or less than a design air density, is greater in a direction of the pressure side than an average angle between the respective planes of the plurality of serrations and the profile chord of the respective rotor blade body, which has been optimized for an air density above the design air density.

9. The rotor blade according to claim 1, wherein the angle between the plane of at least one serration of the plurality of serrations and the profile chord is formed such that:
   the serration has a curvature between a location at which the serration is mounted on the rotor blade and another location on the serration, and/or
   the serration is mounted on a movable part of the rotor blade, wherein the movable part of the rotor blade is configured to be adjusted in such a way that the angle between the serration and the profile chord is variable, and/or
   the serration has a hinge, wherein the hinge is configured to be adjusted in such a way that the angle between the serration and the profile chord is variable, and/or
   the serration is mounted on the rotor blade in such a way that the angle between the plane of the serration and the profile chord deviates from zero such that the rotor blade is not parallel to the profile chord at the mounting point of the serration, and/or
   the serration is angled by compression, tension, or stress in that a tension or compression mechanism acts on the serration create the angle.

10. The rotor blade according to claim 1, wherein lengths of the plurality of serrations from the base line to the at least one end point are dependent on the angle between at least one of the plurality of serrations and the profile chord.

11. The rotor blade according to claim 1, wherein the angle between the plane of at least one serration of the plurality of serrations and the profile chord is configured to be adjusted during an operation of the wind turbine.

12. The rotor blade according to claim 1, wherein the angle between at least one serration of the plurality of serrations and the profile chord is configured to be adjusted dependent on the mounting position in the longitudinal direction of the rotor blade to optimize lifting of the rotor blade such that a yield of the wind turbine is maximized dependent on the position in the longitudinal direction of the rotor blade, and wherein an induction distribution of the rotor blade is configured to be optimized such that the yield of the wind turbine is maximized in a manner dependent on the location by corresponding adjustment of the angle.

13. A wind turbine comprising:
   at least one rotor blade according to claim 1, and
   a controller configured to adapt at least one operating point of the wind turbine dependent on the angle between at least one serration of the plurality of serrations and the profile chord.

14. A method comprising:
   providing the wind turbine of claim 13; and
   adapting an angle of the at least one serration of the rotor blade,
   wherein adapting comprises adapting the angle between the plane of the plurality of serrations and the profile chord dependent on at least one environmental parameter at the installation location of the wind turbine.

15. A method for optimizing a rotor blade having a rotor blade body with a leading edge and a trailing edge that extends in a longitudinal direction of the rotor blade between a root end and a tip end, wherein a cross section of the rotor blade between the leading edge and the trailing edge defines a profile chord, the method comprising:
   mounting a plurality of serrations in a region of the trailing edge of the rotor blade, wherein each serration of the plurality of serrations has a base line, which is arranged at the trailing edge, and an end point, located furthest away from the base line, which together span a plane of the serration,
   wherein a serration of the plurality of serrations is a tooth of a trailing edge ridge of the rotor blade,
   wherein an angle between the plane of at least one serration of the plurality of serrations and the profile chord is formed dependent on at least one environmental parameter at an installation location of the wind turbine, and
   wherein the angle between the plane of the at least one serration of the plurality of serrations and the profile chord is increased in the direction of a pressure side of the rotor blade as the air density decreases thereby adjusting an induction factor distribution of the rotor blade according to deviations of the at least one environmental parameter at the installation location from at least one design parameter of the rotor blade.

* * * * *